Figure 1:
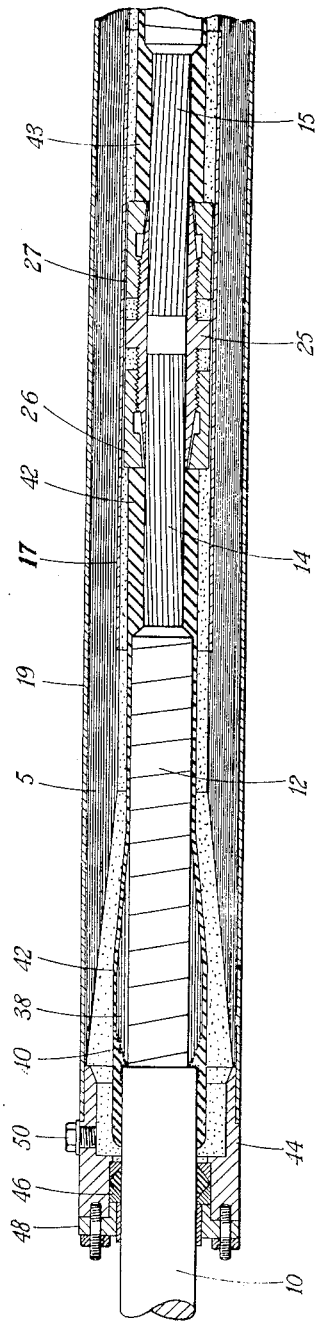

Sept. 26, 1950     E. C. LEE     2,523,313
JOINT AND TERMINATION FOR ELECTRIC POWER CABLES
Filed June 24, 1942     2 Sheets-Sheet 1

INVENTOR
E. C. Lee
BY
ATTORNEY

Sept. 26, 1950 — E. C. LEE — 2,523,313
JOINT AND TERMINATION FOR ELECTRIC POWER CABLES
Filed June 24, 1942 — 2 Sheets-Sheet 2

INVENTOR
E. C. Lee
ATTORNEY

Patented Sept. 26, 1950

2,523,313

UNITED STATES PATENT OFFICE 2,523,313

JOINT AND TERMINATION FOR ELECTRIC POWER CABLES

Edwin Charles Lee, London, England, assignor to International Standard Electric Corporation, New York, N. Y.

Application June 24, 1942, Serial No. 448,250
In Great Britain July 8, 1941

2 Claims. (Cl. 174—73)

This invention relates to electric power cable joints and terminations.

In electric power cable joints and terminations manufactured by the method of surrounding the joint by a sleeve and filling the space within the sleeve with an extrudable solid or semi-solid insulating material, breakdown is sometimes experienced because of the separation of the extrudable insulating material from the cable core and the conductor. This separation may occur on account of expansion and contraction during the heating cycles experienced by the joint or termination and results in the formation of spaces within which ionisation may occur.

It has been suggested, therefore, to wind paper tapes impregnated with styrene around the joint in successive layers until the diameter of the insulation for the full length of the joint reaches that of the external diameter of the lead sheath. After filling the sytrene into the sleeve and heating it, the styrene was polymerized to polystyrene with the result that at the conclusion of the heating treatment the applied tapes were welded into a solid mass of insulating material. Separation still occurred during the heating cycles between these wrappings and the surfaces on which they were wound, which separation brought about a breakdown.

It is, therefore, the object of the present invention to provide a power cable joint for termination of the above mentioned kind which comprises the wrapping of tape impregnated with such insulating material which assures adherence of these wrappings to the surfaces on which they are wound and at the same time causes them to adhere to the polystyrene of the filling.

Another object of the present invention is to provide a power cable joint or termination in which the insulation is built up within the bases of a condenser cone structure in order to avoid radial voltage stress concentrations at the termination of the lead sheaths.

A further object of the present invention is to provide a method of producing a polystyrene-filled power cable joint, of the type described, by convenient and economical means, avoiding the need for applying external heat to the finished joint for purposes of polymerization.

As an example of the invention, in a joint in which a bituminous filling is used the lead sheaths are removed from the two lengths of cable to be jointed, the impregnated paper insulation stripped back to expose the conductors, a sleeve slipped over the end of one of the lengths of cable and the two conductors are jointed by means of a ferrule in any known manner. A wrapping of tape impregnated with bitumen is then made over the jointing ferrule and any exposed lengths of conductor, and is carried over the impregnated paper wrapping of the cable core to overlap the lead sheaths. The sleeve is then slid over the joint, and the joint completed by filling up the sleeve with bitumen and jointing the sleeve to the lead sheaths in any known manner.

Figure 1A:
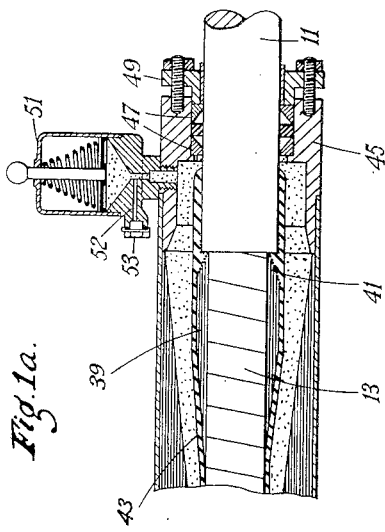

The nature of the invention will be better understood from the following description of two further examples of the invention taken in conjunction with the accompanying drawings in which:

Fig. 1 and Fig. 1a show a joint, and

Figure 2:
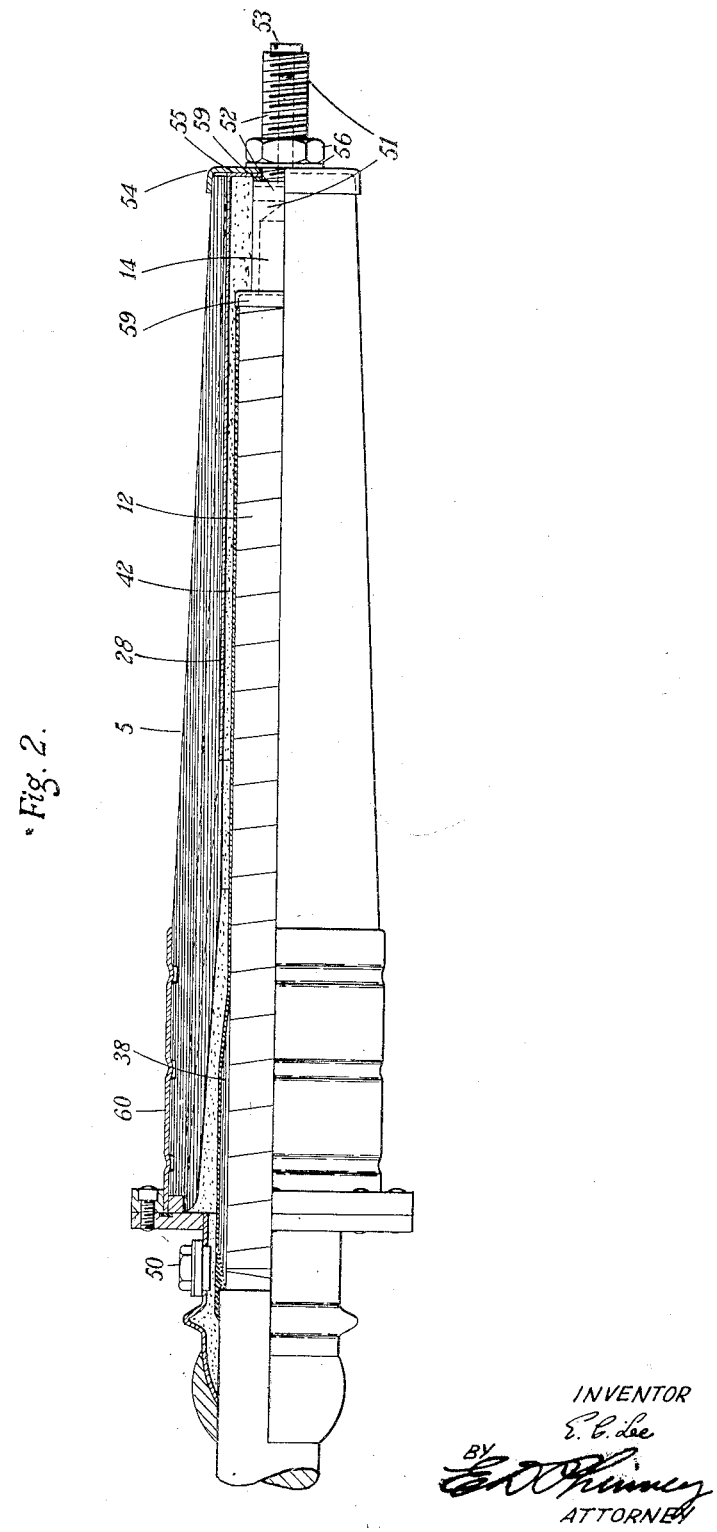

Fig. 2 a termination in accordance with the invention.

Referring to the drawings, Fig. 1 shows a joint between two lengths of power cable. These lengths comprise respectively lead sheaths 10, 11, impregnated paper insulation 12, 13 and conductors 14, 15. The joint is made of two inverted condenser cones disposed apex to apex, forming a unitary tube 5 for telescoping over the ends of the cable. Such condenser cones, serving to establish graduated levels of uniform electrical stress between the conductor and the outer sleeve of the joint, consist of alternating layers of electrically insulating and of conducting material. In the present case they are constructed of interleaved insulating layers of paper impregnated with polymerised styrene and conducting layers. In the preparation of the joint, the lead sheaths 10 and 11 are stripped back from the cable lengths to be joined and the impregnated paper insulation removed from the ends of the conductors 14 and 15. The preformed structure 5 is then slid over the end of one cable length, and the conductors 14, 15 one jointed by a ferrule 25 threaded externally and having screwed thereon nuts 26, 27 the external diameters of which are slightly less than the internal diameter of the structure 5, permitting the passage of filler introduced under pressure. Oil impregnated paper rolls 38, 39 are built up in tapered form over the portions of the paper insulation 12 and 13 adjacent the lead sheaths 10, 11 and bound by binding wires 40, 41 to the lead sheaths 10, 11. These rolls are for the purpose of building up the insulation within the bases of the condenser cone structure 5 in order to avoid radial voltage stress concentrations at the terminations of the sheaths 10, 11. Wrappings 42, 43 of tape comprising polystyrene in its structure is then formed around the bare portions of the conductors 14, 15 and continued to cover the exposed paper insulation 12, 13 and the rolls 38, 39, the binding wires 40, 41 and short lengths of the lead sheaths 10, 11. This tape preferably consists of acetylated cotton impregnated with a mixture of rubber and polystyrene, and the wrappings are made tightly so as to adhere to the surfaces over which they are wrapped.

The unitary condenser cone structure 5 has preferably been wound on a brass sleeve 17, which is then slid along until it is centrally over the ferrule 25. An external metal sleeve 19 is applied over all and gland rings 44, 45 at each end are sweated to the metal sleeve 19, packing rings 46, 47 being interposed between the gland rings 44, 45 and the lead sheaths 10, 11. Clamping rings 48, 49 are tightened up on the ends of the gland rings 44, 45 (the ring 49 is shown in position before being tightened up).

The gland rings 44, 45 are provided with orifices communicating with the space within the sleeve 19. That in the gland ring 44 is shown closed by a plug 50 whilst the orifice in gland ring 45 is shown closed by a pressure booster 51 having an orifice 52 communicating with the orifice in gland ring 45 and with the exterior of the device and closed with a plug 53.

The spaces left within the sleeve 19 are then filled with polystyrene, i. e. the plugs 50 and 53 are removed, and monomeric styrene is fed into the orifice 53 until the spaces within the sleeve 19 are completely filled. Polystyrene, suitably plasticised if desired, is then fed under pressure through the orifice 35 to displace the monomeric styrene until the material issuing from the outlet orifice is of the thick consistency of the polystyrene. The plugs 50 and 53 are then replaced and sealed.

The monostyrene first fed in swells the rubber styrene mixture with which the wrappings 42, 43 are impregnated and assists adherence of these wrappings to the surfaces on which they are wound. The presence of polystyrene in these wrappings also causes them to adhere to the polystyrene of the filling. In consequence separation of the filling of polystyrene from the surfaces on the inner boundary of the space occupied by this filling is prevented.

Referring now to Fig. 2, which shows a cable termination, the impregnated paper wrapping 12 of the cable core is stripped back to bare the conductor 14. A paper roll 38 is built up and finished off as described with reference to Fig. 1. A wrapping 42 of tape containing polystyrene in its composition, preferably acetylated cotton impregnated with a mixture of rubber and polystyrene, is then wrapped tightly over the impregnated paper wrapping and the paper wrapping 12 and tape 42 are held in position by a metal ring 59 which fits over the conductor 14. This ring 59 is held in position by a copper stalk 61 which is sweated to the conductor 14. This stalk 61 is formed with passages 52, which are sealed from the outer air by a screw 53. These passages 52 are used in conjunction with the filling plug 50 for filling the termination with polystyrene.

An inverted condenser cone 5 wound on a metal former 28 is used externally of the termination and an external metal bushing 60 is secured thereto.

The metal former 28 is brazed to a disc 55 and a metal spinning 54 seals the end of the cone 5. The metalspinning 54 is clamped by a nut and washer 56 which compresses a copper asbestos washer 62 and forms a conductive connection between the stalk 61 (and therefore the conductor 14) and the metal former 28. The binding 42 is not continued over the copper stalk 61 because this is at the same potential as the metal former 28 and thus there is no electrical stress on the polystyrene filling between them. Thus there can be no ionisation in any spaces that might be formed by separation of the polystyrene from the copper stalk 61. Similar considerations apply to the portion of the core within a space bounded by the metal former 28 so that over this portion of the core the wrapping 42 does not fulfil its primary purpose. Over the portion of the core away outside the metal former 28, however, the wrapping 42, by adhering to the polystyrene filling prevents the formation of spaces within which ionisation can occur and it is useful to continue the wrapping to the extent shown in order to prevent displacement of the cable paper 12 during filling.

Applicant's invention is defined in the appended claims in which the term "joint" should be construed to cover both a cable joint joining two sections of cable together as shown for example in Fig. 1, and also a termination at which the cable is joined to a terminal as shown for example in Fig. 2.

What is claimed is:

1. The method of jointing lead sheathed insulated high tension cables which comprises the steps of partially removing the lead sheaths and the insulating covering of the cable at the joint, forming wrappings consisting of tape impregnated with a mixture containing rubber and hydrocarbon polymer around the bare portion of the conductors, the exposed insulating covering and short lengths of the lead sheaths, providing a sleeve over the cable, filling the space between the joint and said sleeve with the said hydrocarbon polymer suitably plasticised to render it extrudable.

2. The method according to claim 1, wherein the wrapping comprises applying tape impregnated with a mixture containing rubber and polystyrenes, and the filling comprises applying plasticised polystyrene.

EDWIN CHARLES LEE.

REFERENCES CITED

The following references are of record in the file of this patent:

UNITED STATES PATENTS

| Number | Name | Date |
| --- | --- | --- |
| 1,585,126 | Simons | May 18, 1926 |
| 1,688,693 | Eby | Oct. 23, 1928 |
| 1,992,678 | Studt | Feb. 26, 1935 |
| 2,056,130 | Watson | Sept. 29, 1936 |
| 2,105,567 | Webb | Jan. 18, 1938 |
| 2,147,824 | Webb | Feb. 21, 1939 |
| 2,219,910 | Webb et al. | Oct. 29, 1940 |
| 2,249,458 | Croasdale | July 15, 1941 |

FOREIGN PATENTS

| Number | Country | Date |
| --- | --- | --- |
| 845,011 | France | Aug. 9, 1939 |